Oct. 6, 1959 M. S. HARRIS ET AL 2,907,587
FITTING
Filed June 17, 1957
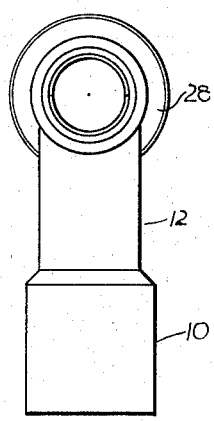
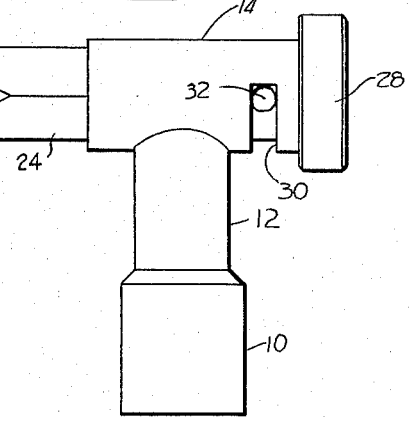
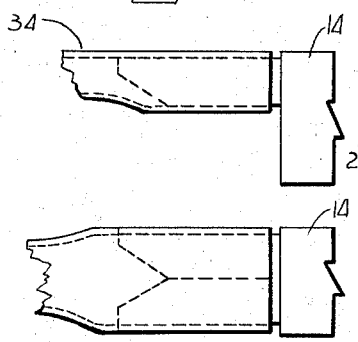
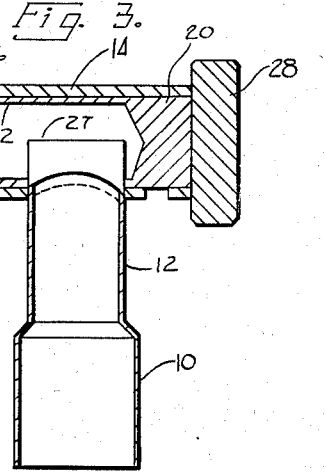
INVENTOR
MANVILLE S. HARRIS
and
CHARLES CLUTZ
BY Diggins & LeBlanc
ATTORNEY 2,907,587

FITTING

Manville S. Harris and Charles Clutz, Rochester, N.Y.

Application June 17, 1957, Serial No. 665,905

5 Claims. (Cl. 284—17)

The present invention relates to a fitting for flexible elastic tubes or hoses and more particularly fittings to which hoses or tubes may be quickly attached in substantially gas-tight relation.

While the present invention relates to a fitting suitable for use with all types of flexible elastic tubes, one particularly advantageous application of the invention is as a fitting for rubber tubing such as is used in laboratories and endo-tracheal tubes used in the administration of anesthetic gases. For simplicity and convenience, the invention will be described in connection with reference to an endo-tracheal tube.

In the administration of anesthetic gases for oral surgery, for example, a flexible rubber tube is inserted through the nose of the patient and into the throat with the lower end positioned at the trachea. The supply of gas is connected to the free end of this rubber tube and gas is administered through the tube.

In apparatus used at the present time, the tube is usually formed with an integral fitting which may be clamped in an adaptor connected to the source of gas. Since the distance from the nostril to the trachea may vary in individual patients, it is sometimes necessary to remove this tube and trim the tube until the end of the tube reaches the proper location.

The present invention relates to an adaptor which can be simply, quickly and readily attached to the end of a rubber tube without the need of any special formation on the tube itself.

One of the objects of the present invention is to provide a fitting for rapid attachment to the end of an elastic flexible tube.

Another object is to provide a fitting for flexible elastic tubes which can be secured in gas tight relation to the tube by a single movement.

These and other objects and advantages reside in certain novel features of construction, arrangement and combination of parts as will be more fully hereinafter set forth and pointed out in the appended claims.

In the drawing:

Figure 1 is a front elevation of one form of fitting according to the present invention;

Figure 2 is a side elevation of the fitting shown in Figure 1;

Figure 3 is a vertical central cross section of the fitting shown in Figures 1 and 2;

Figure 4 is a fragmentary side elevation illustrating the insertion of the fitting into a flexible tube;

Figure 5 is a fragmentary side elevation similar to Figure 4 showing the fitting and tube in operative relation.

In the modification shown in the drawing, the fitting comprises a sleeve or conduit 10 which is connected to a source of gas, not shown, in any suitable manner as is well known in the art. This sleeve 10 has a reduced portion 12 which is connected to a cylindrical sleeve 14. In the embodiment shown, the axis of the sleeve 14 is perpendicular to the axis of the sleeve 10 but this is not essential and the two parts may be angularly related or the sleeve 10 and reduced portion 12 may be curved.

The sleeve 14 has a cylindrical center bore and one end of the sleeve has a projecting lip 16 which has cylindrical outer and inner surfaces. This lip 16 forms an arc of approximately 180° and the outer end of the lip 16 is tapered or beveled as indicated at 18.

Rotatably mounted within the cylindrical bore of the sleeve 14 is a member 20 having a center bore 22 closed at one end. The member 20 is provided with a projecting lip 24 which projects outwardly substantially the same distance as the lip 16. This lip 24 is also about 180° of arc in size and is also provided at its outer end with a tapered or beveled portion 26. The member 20 is provided with a slot 27 in alinement with reduced portion 12 of conduit 10 and this slot 27 is on the same side of the member 20 as the lip 24.

At the end remote from the lip 24, the member 20 is provided with a knob 28 which is preferably knurled for easy manipulation. Adjacent the knob 28, the sleeve 14 is provided with a slot 30 and when the member 20 is inserted in the sleeve 14, a screw or pin 32 is fastened in the member 20 and projects into the slot 30. The slot extends over approximately 180° of the arc.

For attachment of a rubber tube to the fitting described above, the member 20 is rotated by means of the knob 28 until the lips 16 and 24 are in alignment as illustrated in Figure 4. The lips 16 and 24 are then inserted in the end of the rubber tube 34 as shown in Figure 4. The tube 34 is pressed on to the lips 16 and 24 until it engages a flange or abutment 36 on the sleeve 14 and the member 20 is then rotated by means of the knob 28 to the position shown in Figure 5 in which the lips 16 and 24 together constitute a cylinder. This stretches the rubber tube 34 and forms a gas type connection. This rotation also brings the slot 27 into alignment with the reduced portion 12 of conduit 20 permitting gas to flow through the fitting.

It can be readily seen that with the fitting of the present invention, an endo-tracheal tube, for example, can be inserted into a patient until its free end is at the proper location at the trachea. The other end can then be cut to a convenient length and the adaptor of the present invention can be inserted in the cut end of the tube and clamped in position.

It is apparent that the fitting of the present invention has many applications. It can be used for the quick attachment and detachment of hoses and tubes for various purposes and because of the substantial expansion in size due to the rotation of the member 20 and lip 24 with respect to the lip 16, a firm connection is formed without the need of additional clamping members. In addition to this it will be seen that the adaptor provides an automatic valving action in that the reduced diameter portion 12 is cut off as the tube is being mounted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A fitting for flexible elastic tubes comprising a first cylindrical member having an aperture in one side thereof and having a lip extending from one end thereof, a second cylindrical member rotatably mounted within said first cylindrical member and having an aperture therein alineable with said first aperture, the end of said second cylindrical member opposite from the lip end of said first cylindrical member being closed, and a lip extending from the other end of said second cylindrical member, said lips extending around less than the full peripheries of their respective members so that on rotation of said second member said lips may be moved into a first position wherein they overlie one another and into a second position wherein they are opposite one another.

2. A fitting as set out in claim 1 wherein said aperture in said second member is of such a size and is so positioned that said apertures are in alinement when said lips are opposite one another, and are out of alinement so as to close said first mentioned aperture when said lips overlie one another.

3. A fitting as set out in claim 1 wherein said lips are substantially semi-cylindrical and are tapered at the ends thereof.

4. A fitting as set out in claim 3 wherein said first cylindrical member has a slot therein and said second cylindrical member has a pin therein extending into said slot to limit the rotation of said second cylindrical member and to prevent relative axial movement of said members.

5. A fitting for flexible elastic tubes comprising a first cylindrical member having an aperture therein and having a lip extending from one end thereof, a second cylindrical member rotatably mounted within said first cylindrical member and having an aperture therein alineable with said first aperture, the end of one of said cylindrical members opposite from the lip end of said first cylindrical member being closed, and a lip extending from the end of said second cylindrical member adjacent said first lip, said lips extending around less than the full peripheries of their respective members so that on rotation of said second member said lips may be moved into a first position wherein they overlie one another and into a second position wherein they are opposite one another.

References Cited in the file of this patent

UNITED STATES PATENTS

| | | |
|---|---|---|
| 865,451 | Swift | Sept. 10, 1907 |
| 1,405,099 | Cooke | Jan. 31, 1922 |
| 1,499,446 | Code | July 1, 1924 |